United States Patent
Schuler

[11] Patent Number: 5,873,629
[45] Date of Patent: Feb. 23, 1999

[54] VEHICLE SEAT

[75] Inventor: Rolf Schuler, Heiligenhaus, Germany

[73] Assignee: Keiper Recaro GmbH & Co., Remscheid, Germany

[21] Appl. No.: 873,556

[22] Filed: Jun. 12, 1997

Related U.S. Application Data

[63] Continuation of Ser. No. 617,648, Mar. 15, 1996, abandoned.

[30] Foreign Application Priority Data

Mar. 15, 1995 [DE] Germany ........................ 195 09 344.5

[51] Int. Cl.[6] ................................. B60N 2/00; B60N 2/02
[52] U.S. Cl. ........................ 297/341; 297/344.1; 248/430; 296/65.1
[58] Field of Search ................................. 297/341, 344.1; 248/430; 294/65.1, 65 R

[56] References Cited

U.S. PATENT DOCUMENTS

| 1,962,789 | 6/1934 | Simpson et al. | 248/430 |
| 2,160,015 | 5/1939 | Haberstump | 297/341 |
| 2,179,129 | 11/1939 | McGregor | 248/430 |
| 2,428,217 | 9/1947 | Hedley et al. | 297/341 |
| 2,665,740 | 1/1954 | Rappl | 248/430 |
| 4,844,542 | 7/1989 | Humer | 297/341 |
| 4,936,535 | 6/1990 | Johansson | 297/344.1 |

FOREIGN PATENT DOCUMENTS

| 30 36 559 A1 | 4/1982 | Germany . |
| 31 37 151 A1 | 4/1983 | Germany . |
| 36 08 827 A1 | 10/1987 | Germany . |

Primary Examiner—Peter R. Brown
Assistant Examiner—Anthony D. Barfield
Attorney, Agent, or Firm—Wigman, Cohen, Leitner & Myers, P.C.

[57] ABSTRACT

A vehicle seat, particularly a motor vehicle seat, with a pair of runners (7) for longitudinal adjustment, a seat-back (3) which can be tilted forward after releasing a locking device, and a runner latching device (10), which is unlatched at release of the locking device to longitudinally displace the seat. A mechanical detection system (12) detects the distance of the momentary seat position from the initial position based on longitudinal displacement, and is active only at release of the locking device. A tracking and blocking device (13) cooperating with the detection system (12) is provided. The latter allows opening and closing of the runner latching device (10) and/or the locking device only at the zero position of the detection system (12).

10 Claims, 6 Drawing Sheets

VEHICLE SEAT

This is a continuation of application Ser. No. 08/617,648, filed on Mar. 15, 1996, now abandoned.

TECHNICAL FIELD

The invention pertains to a vehicle seat, particularly a motor vehicle seat, which is provided with a path detection system and a tracking and blocking device;

BACKGROUND ART

Known motor vehicle seats of this type which allow sliding the seat to the front as well as tilting the seat-back forward for easy access to the back seats, are equipped with a locking device for return to the original position from which the seat has been slid forward. This locking device has a locking element which is normally coupled to the upper runner of a pair of seat runners, released from the upper runner when the seat back is unlatched for a forward tilt, and fastened to the associated lower runner. In addition, the runner latch is unlatched and held in the unlatched state until the seat reaches the locking element during a return to its initial position after it has been shifted forward. This system is not just costly but also has a relatively large space requirement, which is why it can only be located, as a rule, in the unprotected area beneath the seat. As a result, then, if the seat cannot be returned to its initial position any more because of, for example, loaded items placed behind the seat which was slid to the front, the seat latching device can no longer be latched. The loaded items must then be removed again in order to return the seat to its initial position before a new, initial position, further forward, can be chosen.

DISCLOSURE OF INVENTION

The objective of creating a vehicle seat of the above mentioned type, in which relocating the initial position is possible with simple and space-saving means, is the basis of this invention. From this point, the seat is pushed, forward with the seat back tilted forward for easy access to the rear seats, and renewed seat latching is ensured. This objective is met by a vehicle seat with the features disclosed and claimed herein.

By only activating the detection system with the locking device disengaged, every arbitrary initial position from which the seat is pushed forward, when its seat-back back is tilted forward, can be assigned a zero point for the purpose of the detection system, from which zero point the seat displacement can be measured. For this reason, a path detection system is preferable as the detection system. With the help of a returning device, the seat can then be relatched if it cannot be returned to the initial position after displacement. The detection system need only be returned to its inactive position for this purpose. The return system returns the tracking and blocking device back to its zero position, at which point the runner latching device automatically goes to its latched state.

In a preferred embodiment, the path detection system is mounted moveably onto one of the upper runners, which are solidly connected to the seat frame, and is provided with a wheel which rolls along a rail extending in the direction of, and located on, the lower runner associated with the upper runner. The rotation angle of the wheel is thus proportional to the distance of the momentary seat position from the initial position. In order to avoid slippage between the wheel and the rail, the wheel is preferably constructed as a cog and the rail as a toothed rack. As long as the seat lock has a toothed rack, the cog can be meshed with it.

In order to be able to activate and de-activate the path detection system in a simple manner, it can be located on at least one tilt arm which is hinged at the upper runner by an axis passing through the seat in the perpendicular direction. The effort for the returning device is minimal since its spring loading can be constructed by a spiral spring coupled with the wheel during rotation. Obviously, by means of the tracking and blocking device, the runner latching device cannot be held in the unlatched state until the seat again reaches its initial position; a locking device, likewise present, which locks the seat-back in the forward-tilted position, can be controlled such that it only then allows a return tilt of the seat-back when the seat has reached its initial position and has been latched into it. Advantageous designs of the path detection system as well as the tracking and blocking device are disclosed and claimed herein.

BRIEF DESCRIPTION OF DRAWINGS

In the following, the invention is explained in more detail with the help of illustrated embodiments represented in the accompanying drawings, as follows.

BEST MODE FOR CARRYING OUT THE INVENTION

Figure 1:
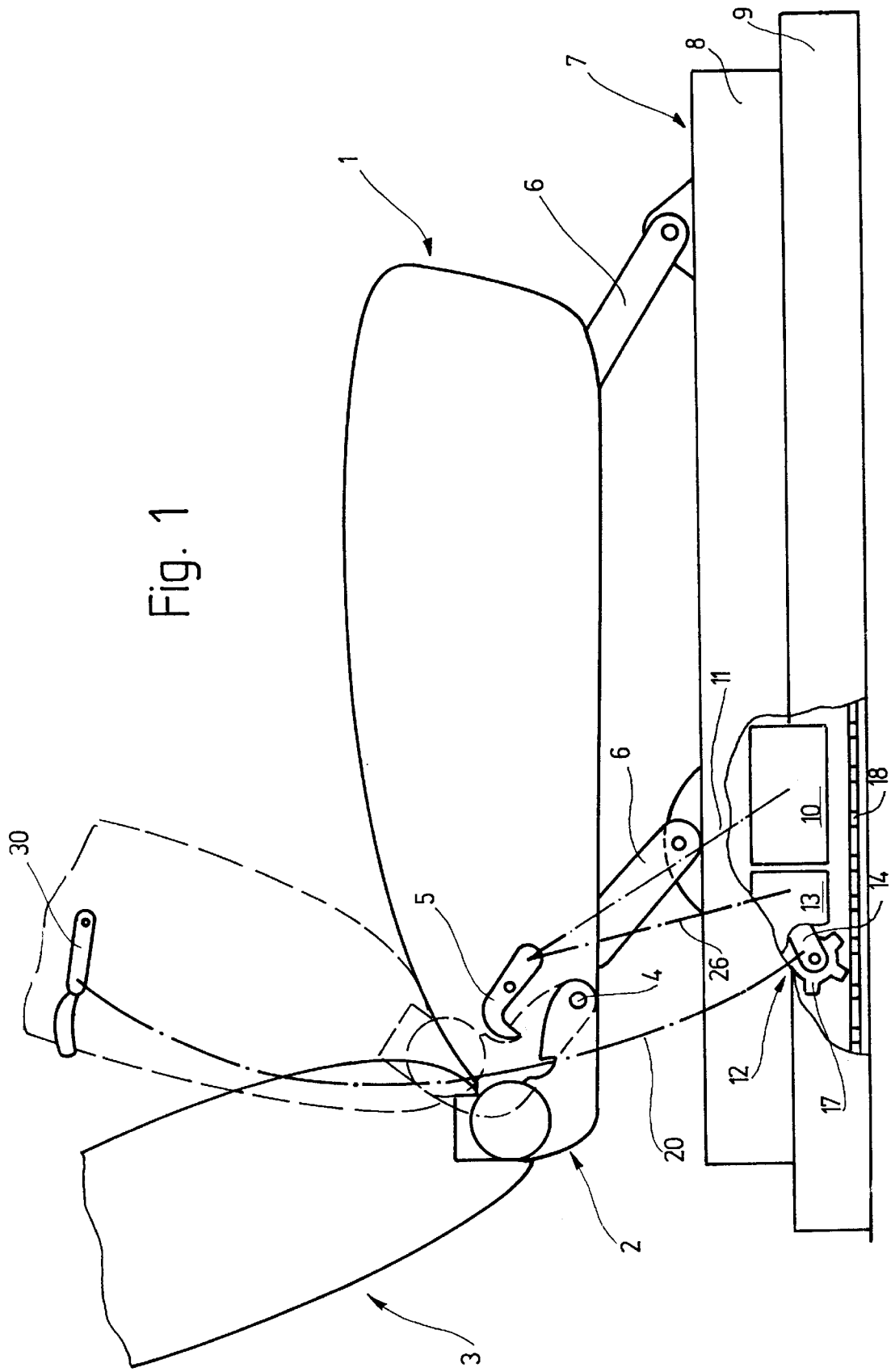
FIG. 1 is an incomplete and partially disassembled side view of the first embodiment of the invention.

Referring to FIG. 1 a seat-back 3 is connected to a seat portion 1 of a motor vehicle seat by a hinged fitting 2 such that it not only can be tilt-adjusted, but also, as FIG. 1 shows, can be tilted forward in order to make access to the rear seats in a two-door vehicle easier. With such a forward tilt of the seat-back 3, the hinged fitting 2 is tilted as a whole about a tilting axis 4. A locking device, which has a tiltable latch 5, locks the seat-back 3 in the forward-tilted position.

The seat portion 1 is connected with two runner pairs, identified as a whole by reference numeral 7, consist each of the runner pairs consisting of an upper runner 8 and a lower runner 9 connected to the vehicle, the seat portion 1 being connected to the lower runner 9 moveably in the direction of the runners 7 but locked in the lateral direction snugly.

A runner latching device 10 is assigned to each of the two runner pairs 7. These two, equally constructed runner latching devices 10 have a known design, and are therefore not described and represented in detail. They can have, for example, latches, bolts or ratchets which, in the latched state, engage in notches of at least one series of notches running in the direction of the runners 7. When adjusting the seat, the runner latching devices 10 are manually opened with a force opposing that of a closing spring by means of a gripping element or the like, not represented.

As soon as the gripping element is released, the runner latching devices 10 go back on their own to the latched state. The runner latching devices 10 are also unlatched if the seat-back 3 has been tilted forward and the latch 5 falls into its locking position since the latch 5 controls the runner latching devices 10 accordingly through a connection schematically represented by line 11. If the seat-back 3 is tilted forward and locked in this position, the seat portion 1 can then also be pushed forward, whereby access to the rear seats is made easier.

Then, in order to be able to again latch the seat in the initial position, if it had been temporarily pushed forward to make access to the rear seats easier, without having to search for this initial position, a path detection system 12 as well as a tracking and blocking device 13 are provided and are both arranged inside one runner pair 7 in the embodiment but thus can obviously also be arranged outside the runner pair 7. The path detection system 12 is carried by two tilt-arms 14 (see FIG 3.) which are tiltably connected to the upper runner 8 about an axis 15 running in the perpendicular seat direction. A rotating threaded spindle 16 is mounted parallel to axis 15 in the tilt-arms 14 and has an unthreaded section which carries a cog 17 solidly connected to it. This cog 17 is situated over a toothed rack 18 which is connected solidly to the lower runner 9. Normally, the tilt arms 14 assume the tilt position represented in FIG. 3, in which the cog 17 is not engaged with the rack 18. If a locking device of the seat-back 3, not represented, is opened in order to be able to tilt the seat-back forward, the two tilt-arms 14 are tilted by means of a control connection, consisting in the illustrated embodiment of a Bowden control cable 20, at an angle α counter-clockwise along a line-of-sight according to FIGS. 1 and 2, whereby the cog 17 engages with the rack 18 and thus activates the path detection system.

The threaded spindle 16 (FIG. 2) carries a spindle nut 21 which is prevented from turning by a guide 22 running parallel to the threaded spindle 16. Thus rotation of the threaded spindle 16 only results in a displacement of the spindle nut 21 in the axial direction of the threaded spindle 16.

Figure 2:
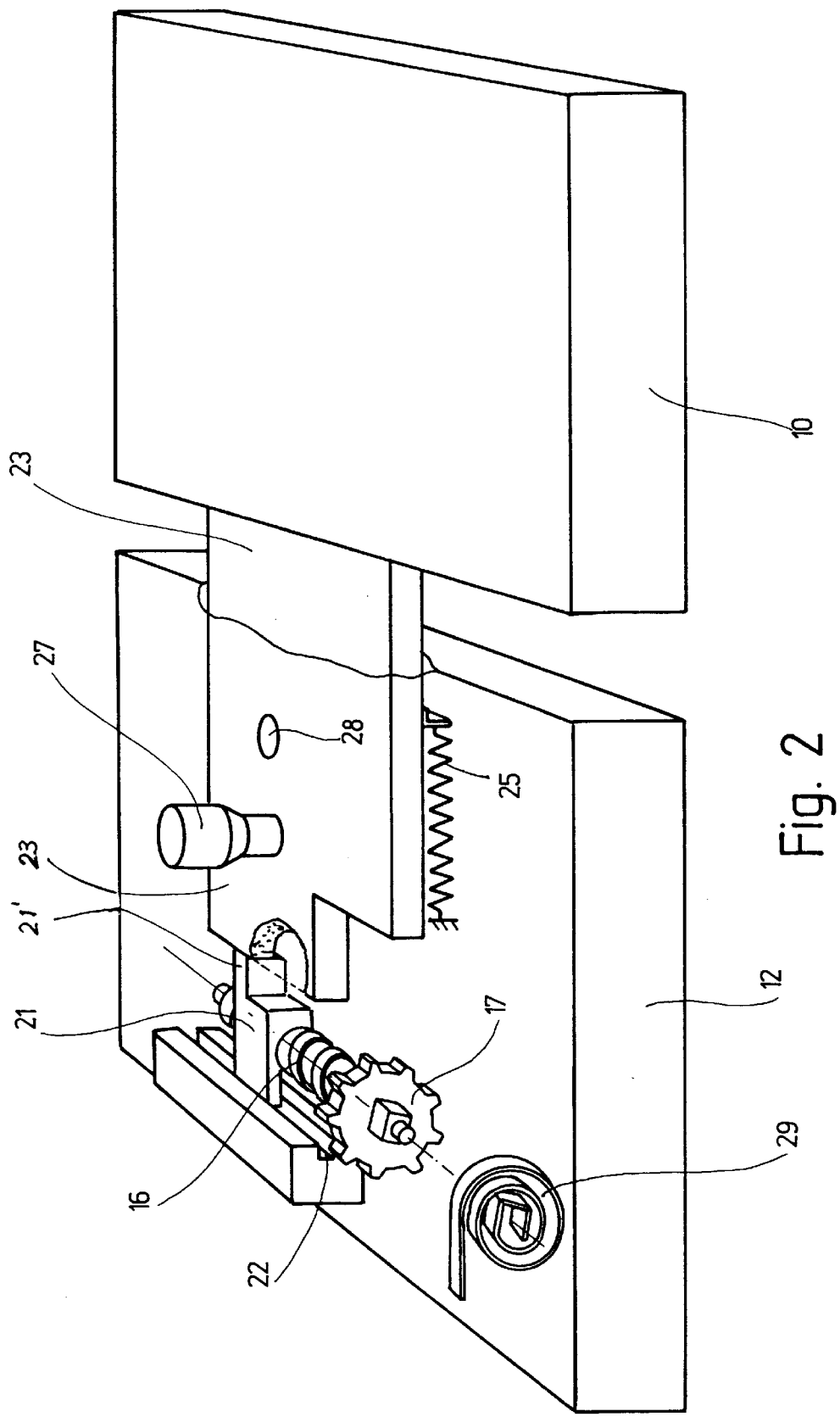
FIG. 2 is a perspective view of the path detection system and the tracking and blocking device of the first embodiment of the invention.
Figure 3:
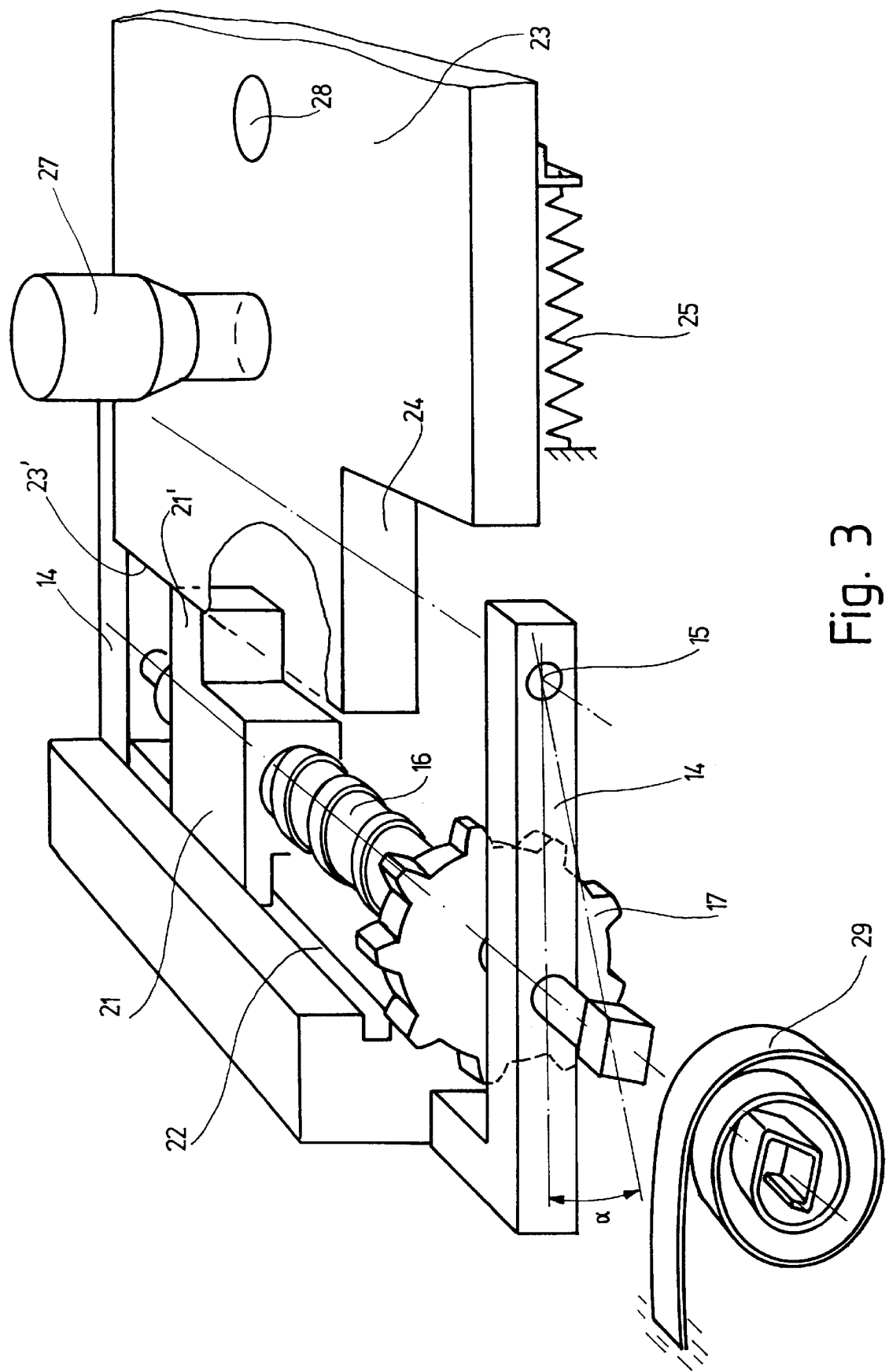
FIG. 3 is an enlarged view of FIG. 2 with more details.

In the embodiment according to FIGS. 1 thru 3, the spindle nut 21 lies between the guide 22 and a latch release 23 of the runner latching device 10, which moves translationally in the longitudinal direction of the upper runner 8. As shown particularly in FIG. 3, the spindle nut 21 has a protrusion 21' facing the latch release 23, which moves together with the spindle nut 21 along the frontal surface 23' of the latch release 23 facing the threaded spindle 16, and which constitutes the tracking and blocking device together with the latch release 23. If the path detection device 12 is at its zero position, the spindle nut 21 is situated directly next to the cog 17 and the protrusion 21' extends into a stepped recess 24. The end section of the frontal surface 23' adjacent to the cog 17 is set back into this region of the recess across from the threaded spindle 16. A pre-tensioned spring 25 gripping the latch release 23 tries to maintain the latch release 23 in this position.

If the runner latching device 10 is unlatched, the latch release 23 moves away from the threaded spindle 16 around the step heights of the recess 24 against the force of the spring 25. The spindle nut 21 is thus released so that the spindle nut 21 can be moved to a position in which the frontal surface 23' lies against it, thereby blocking the latch release 23 in the unlatched position. This is done by rotating the cog 17 of the protrusion 21'. Since the spindle nut 21 is displaced fully in the axial direction of the threaded spindle 16 in one or the other direction, wherein the seat is first pushed forward and then backward again to facilitate raising the seat, the distance of the protrusion 21' from its zero position, at which it is situated on the recess 24, is proportional to the distance of the seat from its initial position. Only when the seat has reached its initial position again, does the protrusion 21' release the latch release 23 to enable activation of the runner latching device 10.

Since the locking device, which locks the seat-back 3 into the forward-tilted position, should only be released again when the seat has reached its initial position and when the runner latching device is again closed for safety reasons, latch 5 is connected to a sensor over a control connection which is represented in FIG. 1 by line 26. This sensor identifies the position of the latch release 23. In the embodiment example, this sensor consists of a spring-loaded bolt 27 (FIG. 2) which engages into hole 28 of the latch release 23 when it is located in the locking position and sits on the latch release 23 when this release is located outside its locking position, i.e. when the runner latching device 10 is open. As long as the runner latching device 10 is not closed, bolt 27 cannot drop into the hole 28. The latch 5 is held in the locking position until the seat is again latched into the initial position.

In the embodiment of the invention, the threaded spindle 16 is coupled to a pretensioned return spring 29 in non-rotating fashion. This spring 29 is designed as a spiral spring in the embodiment, and has an outer end connected solidly to one of the two tilt-arms 14 and an inner end connected non-rotationally to the threaded spindle 16. This return spring makes it possible to lock the seat, moved out of its initial position, into any desired position again. It is only necessary here to lift the path detection device (FIG. 1) from the toothed rack 18 by the Bowden cable 20 using a release lever 30 or the like, which is used to release the locking device of the seat-back 3, and thus to disengage the cog 17. The return spring 29 turns the threaded spindle 16 far enough until the protrusion 21' of the spindle nut 21 reaches the zero position, at which point the latch release 23 is released.

The second embodiment of the invention as represented in FIGS. 4 thru 8, differs from the first embodiment only in the design of its path detection system 112 and its tracking and blocking device 113 as well as the control of the latter. Therefore, the following will only describe these components individually. Due to details of the remaining seat sections, reference will be made to the first embodiment.

Figure 4:
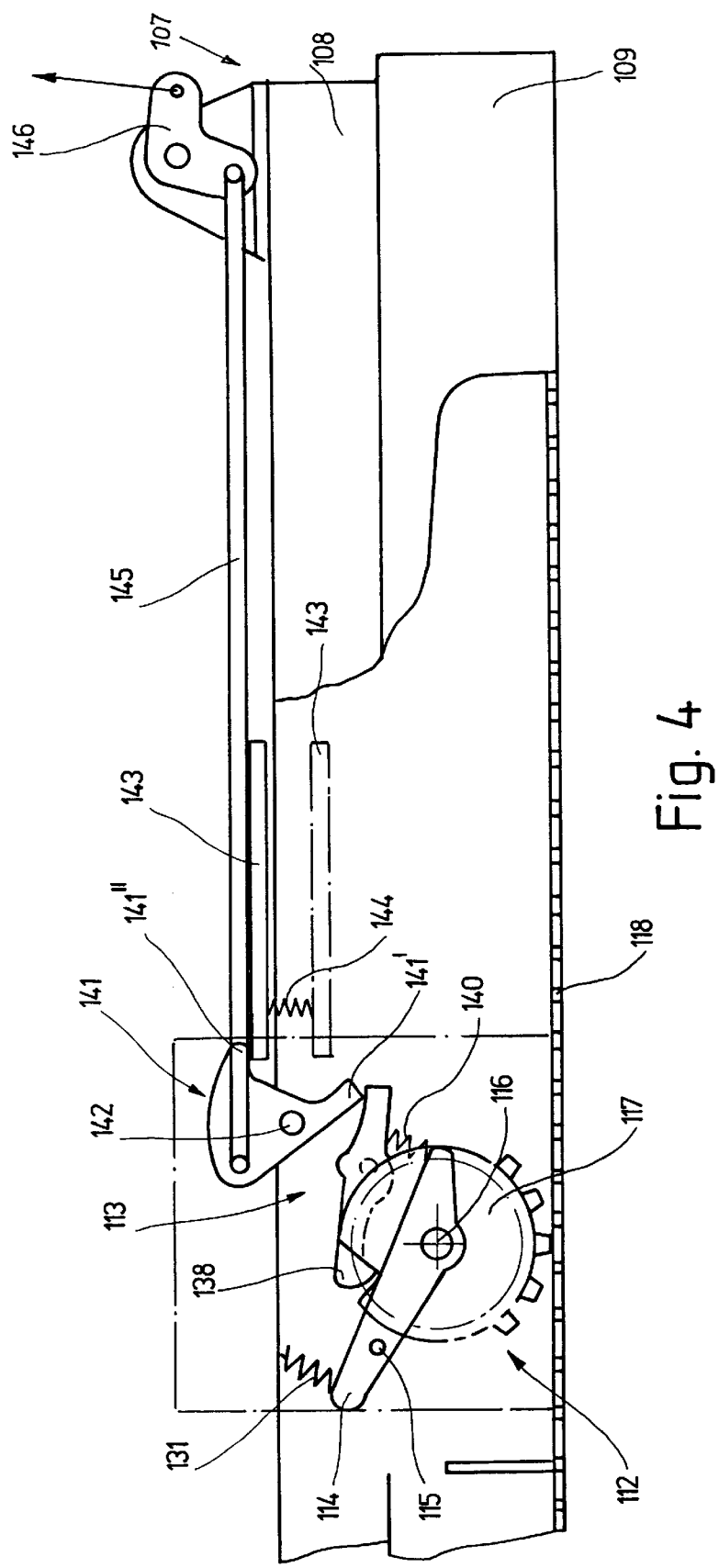
FIG. 4 is an incomplete and exploded side view of the seat-runner pair and the path detection system associated with it as well as the tracking and blocking device of a second embodiment of the invention.
Figure 5:
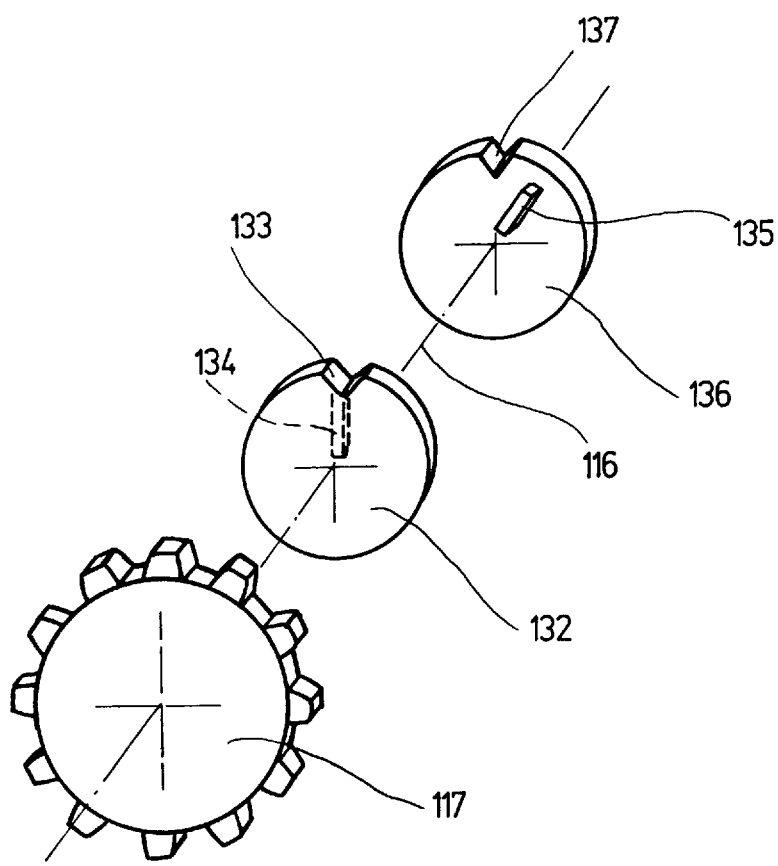
FIG. 5 is a perspective and exploded view of the path detection system of the second embodiment of the invention.

The path detection system 112 is represented in the interior of the runner pair 107, but could obviously be located outside of the runner pair 107. Two identical tilt-arms 114, each forming a two-armed lever, are mounted tiltably on an axis 115 which runs in the direction perpendicular to the seat and which is connected to the upper runner 108 of the runner pair 107. A shaft 116 is rotatably mounted in an arm of each of the two two-armed levers, as FIG. 4 shows for one tilt-arm 114. This shaft is held at a distance from axis 115 as well as from the one end of the arm, and runs parallel to axis 115 and has a cog 117 solidly attached to it. The cog 117 can be brought to a position, by tilting the tilt-arm 114, from above a toothed rack 118 provided at the lower runner 109, to which the cog is engaged with the rack 118. At the other arm of the two tilt-arms 114, a pre-tensioned spring 131 is attached to each, is supported on the other side at the upper runner 108, and strives to hold the tilt-arm 114 in the position at which the cog 117 is disengaged from the toothed rack 118. A cam 132 is located next to the cog 117, solidly on the shaft 116, the curve of which as formed by its outside surface runs concentrically to the shaft 116 up to a wedge-shaped notch 133.

As long as the displacement of the seat from the initial position forward can be greater than the circumference of the cog 117, which is normally the case, but only twice as much as the circumference of the cog 117 at most, a limiter 134 is provided on the side of the first cam 132 turned away from the cog 117, which cooperates with a limiter 135 which is located on the side of a second cam 136 turned away from the first cam 132. Otherwise, the second cam 136 is identically designed as the first cam 132, but is freely rotatable about shaft 116.

Since the upper runner 108 is displaced to the left, in the representation according to FIG. 4, when the seat-back is tilted forward and in addition when the seat is displaced forward, this displacement of the seat results in rotation of the cog 117 in the counterclockwise direction. The rotation of the cog 117 and the first cam 132 out of the zero position, represented in FIG. 5 and 6 results in the limiter 134 being distanced from limiter 135, against which it lies at the zero position, and then, if the cog 117 is rotated more than around 360°, it again comes to rest at limiter 135 and thus takes up the second cam 136. Correspondingly, during a displacement of the seat back to its initial position, the second cam 136 is taken up again just after the first cam 132 is rotated clockwise at about 360°. From this instant onward, the notch 133 aligns again with the corresponding notch 137 of the second cam 136.

Figures 6, 7:
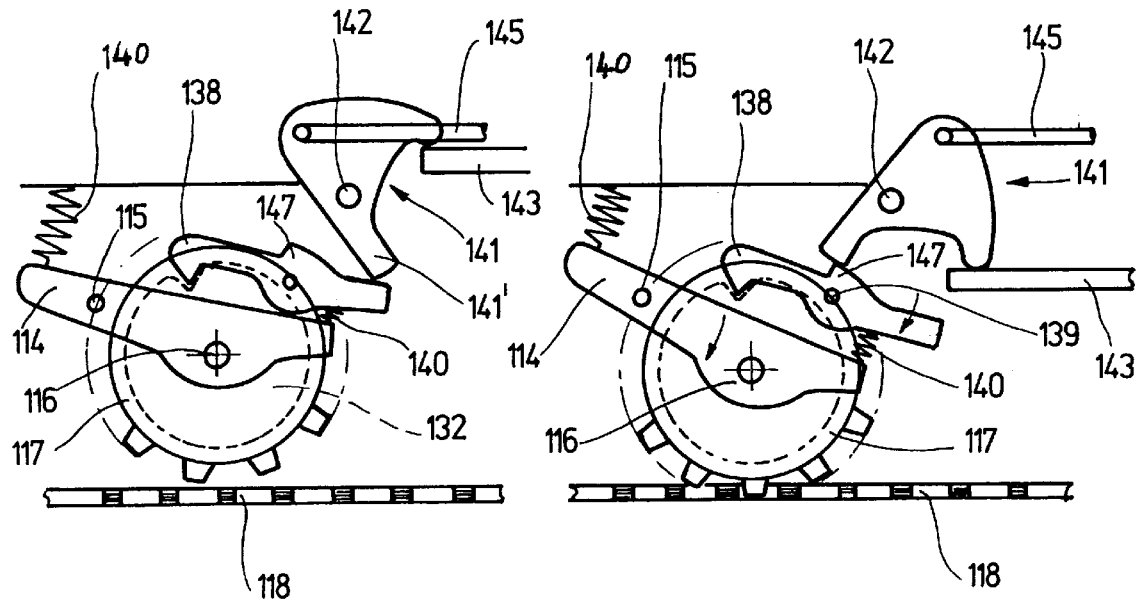
FIG. 6 is a side view of the path detection system as well as of the tracking and blocking device of the second embodiment of the invention in the inactive state.
FIG. 7 is a side view of the path detection system as well as the tracking and blocking device in the active state prior to a displacement of the seat from its initial position.

The tracking and blocking device 113 has a ratchet 138 which is tilted about an axis 139 running parallel to shaft 116, and which is situated on the two cams 132 and 136 with its wedge-shaped end such that this end can engage snugly into the two notches 133 and 137 when the path detection system 112 is at its zero position, as shown in FIG. 4 and 6.

The ratchet 138 is designed as a two-armed tilt lever. The arm arranged diagonally across from the arm with the wedge-shaped end is loaded by a pressure spring 140 to engage the wedge-shaped end into the notches 133 and 137. On the other side, the pressure spring is supported at the arm with the shaft 116. In this way, the rotational moment exerted by the pressure spring 140 onto the tilt-arm 114 is partially exerted onto the ratchet 138.

An arm 141' of a two-armed lever 141 extends into the tilt region of the arm of the ratchet 138 supported by the pressure spring 140. This arm 141' is mounted to the upper runner 108 with an axis 142 parallel to shaft 116, but in the embodiment it lies partially above it.

While the first arm 141' of the two-armed lever 141 cooperates with the ratchet 138, the second arm 141" cooperates with a control element 143, the function of which coincides with that of the latch release 23 of the first embodiment, but is mounted moveably in the vertical direction in the upper runner 108 in this embodiment. When the control element is located in the position represented in FIG. 4 and 6, i.e. somewhat above the upper runner 108, the runner latching device is latched. By moving against a return spring 144 downward to the position represented in FIG. 4 with the dashed line, and in FIGS. 7 and 8 with the solid line, the runner latching device is released.

At a distance from the axis 142, an actuating rod 145 engages the second arm 141" of the two-armed lever 141 parallel to the upper runner 108, which is pivoted at the other side beneath the seat-back at an arm of a rotating angled lever 146, and a connection leads from its other arm to the release mechanism for the seat-back locking device.

If the seat-back locking device is released by a corresponding engagement or the like, the angled lever 146 and the two-armed lever 141 are simultaneously tilted, the latter clockwise. By tilting the two-armed lever 141, its first arm 141' presses the ratchet 138 downward so that the tilt arms 114 are likewise tilted in the clockwise sense along a line of sight according to FIGS. 6 thru 8. The cog 117 is thus engaged with the toothed rack 118. The path detection system 112 is thus activated. At the same time, the second arm 141" of the two-armed lever 141 moves the control element 143 downward to the position represented in FIGS. 7 and 8, at which the runner latching device is opened.

Figure 8:
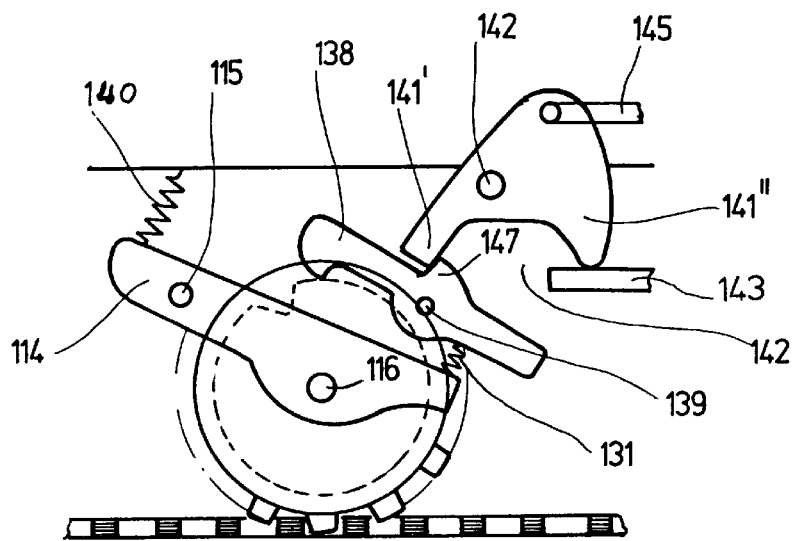
FIG. 8 is a side view of the path detection system as well as the tracking and blocking device after a displacement of the seat from its initial position.

If the seat-back is tilted forward and the seat is displaced to the front, the cog 117 and the first cam 132 rotate in proportion to the direction of travel. The wedge-shaped end of the ratchet 138 are pushed out of the notch 133 and thus out of notch 137 as well, by this rotation, whereupon, as shown in FIG. 8, the free end of the first arm 141' of the two-armed lever 141 is led away over the back of a tooth-shaped cam 147 and comes to rest on its steep flank. In this way the locking device for the seat-back and the runner latching device cannot come to the locked position again since this would require a rotation of the two-armed lever 141 counterclockwise at a line of sight according to FIG. 8, which is prevented by the cam 147 as long as the wedge-shaped end of the ratchet 138 lies against the cylindrical portion of the curve of the first cam 132 as well as the second cam 136. Only when the seat is back in its initial position and the notches 133 and 137 are thus directed at the wedge-shaped end of the ratchet 138 does the wedge-shaped end of the ratchet 138 fall into the notches 133 and 137 by the rotating moment exerted by the pressure spring onto the ratchet 138. The tooth-shaped cam 147 releases the first arm 141' which results in the two-armed lever 141 being able to tilt back to its initial position, at which point the runner latching device as well as the seat-back locking device can return to the locked state.

In this second embodiment another, locking the seat in a position other than the initial position is also possible as long as the path detection system 112 has a return system similar to the first embodiment, which can be a pre-tensioned spiral spring as in the first embodiment another. To lock the seat into a position other than the initial position, the cog 117 need only be lifted out of the toothed rack 118. A sufficient height of the tooth-shaped cam 147 also then enables a corresponding tilt of the tilt-arm 114 when the first arm 141' of the two-armed lever 141 sits against the steep flank of the tooth-shaped cam 147. After lifting the cog 117 out, the return system rotates the path detection system 112 back to the zero position. If the cog 117 is, shortly thereafter, dropped into engagement with the toothed rack 118, the ratchet 138 releases the two-armed lever 141. While preferred forms and arrangements have been shown in illustrating the invention, it is to be understood that various changes and modifications may be made without departing from the spirit and scope of this disclosure.

I claim:

1. A vehicle seat comprising:
   a locking device;
   a pair of runners for longitudinal displacement of said seat from an initial position thereof to various momentary positions thereof;

a seat-back which can be tilted forward after release of the locking device;

a runner latching device which is unlatched for seat displacement when the locking device is released;

a mechanical detection system having a zero position corresponding to the initial position of said seat and other positions corresponding to the various momentary position of said seat, said-mechanical detection system being activated only at release of the locking device for detecting the distance between the momentary position of the seat and its initial position based on longitudinal displacement of said mechanical detection system from zero position; and tracking and blocking means cooperating with the mechanical detection system, and responsive to the value of the amount of distance detected by the mechanical detection system for blocking opening and closing of at least one of the runner latching device and the locking device in all positions of the mechanical detection system other than the zero position;

wherein the mechanical detection system is tied to a return device which can be activated in each position, other than the zero position, of the mechanical detection system for the purpose of return to the zero position;

wherein said mechanical detection system has a wheel which rolls, only in an active state of the mechanical detection system, along a path running in a longitudinal direction, said wheel comprising a cog; and wherein the cog is connected to a threaded spindle non-rotationally, said threaded spindle having a blocking element arranged thereon and secured from rotation, said blocking element blocking the runner latching device from the zero position of the mechanical detection system in a released state.

2. A vehicle seat according to claim 1, wherein said mechanical detection system comprises a path detection system.

3. A vehicle seat according to claim 2, wherein said path detection system is mounted moveably to one of a pair of upper runners solidly connected to a seat frame, and wherein said wheel rolls, only in an active state of the path detection system, along a path running in a longitudinal direction of a lower runner associated with said one of the pair of upper runners.

4. A vehicle seat according to claim 3, wherein said path comprises a toothed rack.

5. A vehicle seat according to claim 4, further comprising at least one tilt-arm carrying the path detection system and pivoted on the upper runner with an axis running perpendicular to a seat direction.

6. A vehicle seat according to claim 5, wherein said return device comprises a spring loading device.

7. A vehicle seat according to claim 6, wherein said return device comprises a spiral spring rotationally connected to the cog.

8. A vehicle seat according to claim 1, wherein said path comprises a toothed rack.

9. A vehicle seat according to claim 1, wherein said return device comprises a spring loading device.

10. A vehicle seat according to claim 1, wherein said return device comprises a spiral spring rotationally connected to the wheel.

* * * * *